US008333302B2

(12) United States Patent
Fukunaga

(10) Patent No.: US 8,333,302 B2
(45) Date of Patent: Dec. 18, 2012

(54) WINE DISPENSER

(75) Inventor: Hideshi Fukunaga, Kitakyushu (JP)

(73) Assignee: Mitsuhiro Co., Ltd., Fukuoka (JP)

( * ) Notice: Subject to any disclaimer, the term of this patent is extended or adjusted under 35 U.S.C. 154(b) by 0 days.

(21) Appl. No.: 13/138,899

(22) PCT Filed: Apr. 30, 2009

(86) PCT No.: PCT/JP2009/058521
§ 371 (c)(1),
(2), (4) Date: Nov. 23, 2011

(87) PCT Pub. No.: WO2010/125684
PCT Pub. Date: Nov. 4, 2010

(65) Prior Publication Data

US 2012/0055955 A1 Mar. 8, 2012

(51) Int. Cl.

| | |
|---|---|
| ***B67D 7/06*** | (2010.01) |
| ***B67D 7/60*** | (2010.01) |
| ***G01F 11/00*** | (2006.01) |
| ***B01D 12/00*** | (2006.01) |
| ***B01D 17/00*** | (2006.01) |
| ***B01D 43/00*** | (2006.01) |

(52) U.S. Cl. .................... 222/185.1; 222/386; 210/532.1

(58) Field of Classification Search ............... 222/185.1, 222/387, 386, 328, 184, 332, 321.5; 137/140; 210/532.1; 220/578, 580, 216, 227, 220, 220/592.18, 623, 660, 661, 662; 215/231; D07/300, 313; 202/152, 153, 158
See application file for complete search history.

(56) References Cited

U.S. PATENT DOCUMENTS

| | | | | |
|---|---|---|---|---|
| 99,725 | A * | 2/1870 | Stone | 220/592.18 |
| 123,390 | A * | 2/1872 | Geenen | 222/131 |
| 2,715,465 | A * | 8/1955 | Wood | 210/238 |
| 2,716,508 | A * | 8/1955 | Booth | 222/131 |
| 5,275,305 | A | 1/1994 | Gross | |
| 2005/0284884 | A1 * | 12/2005 | Roy-Wedderburn | 222/105 |

FOREIGN PATENT DOCUMENTS

| | | |
|---|---|---|
| GB | 1 437 321 | 5/1976 |
| GB | 2 340 813 | 3/2000 |

(Continued)

OTHER PUBLICATIONS

Microfilm of the specification and drawings annexed to the request of Japanese Utility Model Application No. 27629/1975 (Laid-open No. 108970/1976) (Hideshi Fukunaga), Aug. 31, 1976, p. 1, line 12 to p. 3, line 9; Fig. 2 (Family: none).

(Continued)

*Primary Examiner* — Patricia Bianco
*Assistant Examiner* — Benjamin R Shaw
(74) *Attorney, Agent, or Firm* — Jordan and Hamburg LLP

(57) ABSTRACT

An upstanding cylinder and a loading lid are produced respectively from glass. On the upper face of the bottom plate of the cylinder, a substance-pooling concave in which wine lees and tartar are pooled is formed. Owing to this constitution, there is little risk that the external air enters through a gap between the sliding faces of these members into the wine-pooling section in the cylinder and causes the oxidation of the wine. Since the cylinder comprises glass, the wine can be stored under almost the same conditions as in bottles. Further, sanitary precautions can be easily taken. Furthermore, problems such as the sticking of the cylinder to the loading lid due to stainless steel rust and so on can be overcome.

1 Claim, 4 Drawing Sheets

FOREIGN PATENT DOCUMENTS

| | | |
|---|---|---|
| JP | 11-314695 | 11/1999 |
| JP | 2002-240894 | 8/2002 |
| JP | 2008-195422 | 8/2008 |

OTHER PUBLICATIONS

Microfilm of the specification and drawings annexed to the request of Japanese Utility Model Application No. 91252/1980 (Laid-open No. 13497/1982) (Shozo Kanno), Jan. 23, 1982, p. 1, line 15 to p. 2, line 9; Fig. 1 (Family: none).

Microfilm of the specification and drawings annexed to the request of Japanese Utility Model Application No. 166616/1984 (Laid-open No. 83597/1986) (Sanyo Electric Co., Ltd.) Jun. 2, 1986, p. 7, lines 7 to 11; Fig. 1 (Family: none).

* cited by examiner

WINE DISPENSER

TECHNICAL FIELD

The present invention relates to a wine dispenser, more particularly, relates to a wine dispenser that can prevent wine from oxidizing and dispense wine into a glass.

BACKGROUND ART

As a conventional wine dispenser, for example, "Device for Selling Wine by Cup" disclosed in Patent Document 1 which has been previously filed by the present applicant is known. In the device, a wine flow-out tube with a cock communicating with an inner space of an upright cylinder is provided at the bottom of the cylinder, a load lid having an outer circumferential face slidably coming into contact with an inner circumferential face of the cylinder is inserted into the cylinder and an upper end of the cylinder is opened to the atmosphere. The cylinder and the load lid are made of stainless steel. An upper face (bottom wall face of the inner space) of a bottom plate of the cylinder is flat, and a lower end of a butt side opening of the wine flow-out tube is provided at the same height as that of the upper face of the bottom plate of the cylinder so that wine in the cylinder can be entirely discharged.

Wine is poured into the cylinder, and the load lid is inserted into the cylinder with a bottom face of the load lid coming into contact with a surface of the wine. When the cock is opened in this state, the wine in the cylinder is poured into a glass through the wine flow-out tube by weight of the wine and static load of the load lid. Accordingly, the load lid gradually falls in accordance with the dispensing amount of the wine with the outer circumferential face of the load lid coming into contact with the inner circumferential face of the cylinder. Accordingly, during use of the wine dispenser, the wine hardly comes into contact with the atmosphere and can be prevented from oxidizing.

PRIOR ART

Patent Document

Patent Document 1: Japanese Published Unexamined Utility Model Application No. S51-108970

SUMMARY OF THE INVENTION

Problem(s) to be Solved by the Invention

However, since the cylinder and the load lid are made of stainless steel, the smoothness between each of the sliding faces is poor. Thus, a slight gap is easily generated between an inner circumferential wall of the cylinder and an outer circumferential wall of the load lid, and air is likely to enter through the gap to oxidize the wine. Additionally, the wine in the cylinder cannot be visually recognized.

Further, it is known that, in the case where the cylinder and the load lid are made of austenite-based stainless steel, a grain boundary is coarsened at a peripheral portion (thermal influence portion) of a welding point, impurities are educed to the grain boundary at the peripheral portion, composition change, for example, change in the steel to martensite is caused and rust is generated. The situation is brought about in which a gap is generated between the sliding faces of the cylinder and load lid by rust, the cylinder and load lid are firmly fixed to each other at worst, and wine cannot be poured into a glass.

On the other hand, sediment of fine dust, tartar (calcium hydrogen tartrate, etc.) etc., are generated during maturation in high-grade wine matured in a bottle for along time, several or tens of years. The sediment and tartar are impurities of wine and spoil the taste of wine. In the wine dispenser of Patent Document 1, as described above, a bottom face of an inner wall of the cylinder is flat and the wine flow-out tube is provided at the same height as that of the bottom face of the inner wall of the cylinder. Thus, when wine is dispensed into a glass, sediment and tartar collected on the bottom of the cylinder also flow into the glass.

Then, the inventor, as a result of diligent research, discovered that the above problem is perfectly solved by making a cylinder and a load lid made of glass and forming, on an upper face of a bottom plate of the cylinder, a foreign matter collecting recess portion for collecting sediment and tartar, and completed the present invention.

It is an object of the present invention to provide a wine dispenser which can prevent wine from oxidizing, dispense wine with stable quality for a long time, allow a user to visually recognize wine in a cylinder and prevent, in dispensing wine into a glass, sediment and tartar from flowing into the glass.

Means for Solving the Problem

In a wine dispenser of a first aspect of the present invention including: an upright cylinder which has an opened upper end face and stores wine; a wine flow-out tube which communicates with an inner space of the cylinder and has a lower end of a butt side opening arranged on a circumferential side wall of the cylinder at the same height as that of a flat upper face of a bottom plate of the cylinder; a cock provided in the middle of the wine flow-out tube; a load lid which rises/falls, in a state where an outer circumferential face of the load lid liquid-tightly comes into contact with an inner circumferential face of the cylinder, in an inner space of the cylinder and has an air vent hole penetrating from an upper face to lower face of the load lid; and a stopper for stopping up the air vent hole, the cylinder and the load lid are made of glass and a foreign matter collecting recess portion for collecting sediment of the wine is formed on the upper face of the bottom plate of the cylinder.

According to the first aspect of the present invention, wine is poured into the inner space of the cylinder and the load lid is inserted into the cylinder with the lower face of the load lid coming into contact with a surface of the wine. Here, the stopper is pulled out and the air vent hole is opened. Thus, air collected between the surface and the load lid is released into the atmosphere through the air vent hole. Then, the air vent hole is stopped up with the stopper.

When the cock is opened in this state, wine in the cylinder is, by static load of the load lid and weight of the wine, poured into a glass from the wine flow-out tube. Accordingly, the load lid gradually falls in accordance with the dispensing amount of the wine with the outer circumferential face of the load lid coming into contact with the inner circumferential face of the cylinder. Accordingly, during use of the wine dispenser, the wine hardly comes into contact with the atmosphere and is prevented from oxidizing. Additionally, the lower end of the butt side opening of the wine flow-out tube is arranged on the circumferential side wall of the cylinder at the same height as that of the flat upper face of the bottom plate of the cylinder. Thus, even if the cylinder is not inclined, the wine, except part thereof (containing sediment) in the foreign matter collecting recess portion, in the cylinder can be entirely discharged from the wine flow-out tube.

Since the cylinder and the load lid are made of glass, liquid-tightness between each of the sliding faces is higher than that of a conventional cylinder and load lid made of stainless steel. Thus, there is almost no possibility that outer air enters a wine storing portion in the cylinder through a gap between each of the sliding faces and oxidizes the wine. Further, the problem in which a cylinder and a load lid are firmly fixed to each other from the rust of stainless steel is solved. Glass of the cylinder may be transparent, semitransparent or nontransparent. Since the cylinder is made of glass, wine can be stored at the same conditions as those of storing wine in a bottle. Furthermore, sanitation management is easy.

After wine is poured into the cylinder and left for a predetermined time, sediment and tartar fall and they are collected in the foreign matter collecting recess portion. Thus, when the cock is opened to dispense the wine into a glass, the sediment and tartar hardly flow into the glass through the wine flow-out tube. Additionally, wine with stable quality can be dispensed for a long time, and wine in the cylinder can be visually recognized.

Any wine, for example, white wine, red wine, rose wine or the like may be poured into the cylinder.

The cylinder is a cylindrical-shaped container in which a lower side opening of a cylindrical-shaped circumferential side wall of a main body (body portion) of the cylinder is sealed with a disk-shaped bottom plate and an upper face of the main body is opened. The cylinder has a vertical axis line. As glass which is material of the cylinder, for example, strengthened glass can be adopted.

The bottom plate of the cylinder is a disk having an upper face and lower face orthogonal to the axis line of the cylinder.

The inner space of the cylinder is a space for storing wine and serves as a rising/falling path of the load lid.

The inner circumferential face of the cylinder is an inside face of the circumferential side wall of the cylinder.

As material of the wine flow-out tube, for example, glass, stainless steel, plastic or the like can be mentioned.

The load lid is a columnar or cylindrical container having an outer diameter almost the same as an inner diameter of the cylinder.

The outer circumferential face of the load lid is an outside face of the circumferential side wall of the load lid.

One or more of the air vent holes may be formed. A cross section of the air vent hole may be circular, or polygonal, for example, triangular or quadrilateral.

The size and shape of the stopper are properly selected in accordance with those of the air vent hole.

A cross section of the wine flow-out tube may be circular, elliptical or polygonal, for example, triangular, quadrilateral or five or more sided. For example, a rubber buffering ring may be provided at the periphery of a top end of the wine flow-out tube so that an impact when the top end comes into contact with a glass does not crack the glass.

"The lower end of the butt side opening of the wine flow-out tube is arranged at the same height as that of the flat upper face of the bottom plate of the cylinder" indicates a state where the lower end of the butt side opening of the wine flow-out tube continues to the upper face of the bottom plate of the cylinder.

As the cock, for example, a butterfly valve, a gate valve, ball valve or the like can be adopted.

The "liquid-tightness" herein indicates a state where, even if the load lid rises/falls, liquid (wine) does not leak from a gap between the inner circumferential face of the cylinder and the outer circumferential face of the load lid.

In a wine dispenser of a second aspect of the present invention, the foreign matter collecting recess portion is annularly formed on a region, except a central portion supporting the load lid reaching a lowest point, of the upper face of the bottom plate of the cylinder in the wine dispenser of the first aspect.

According to the second aspect of the present invention, when the load lid reaches the lowest point of the inner space of the cylinder, only a central portion of the lower face of the load lid is supported by the central portion of the upper face of the bottom plate of the cylinder. That is, an outer circumferential edge (lower edge portion of the circumferential side wall), which is most easily damaged by contact between the load lid and the cylinder, of the lower face of the load lid does not come into contact with the cylinder. Accordingly, lowering of the liquid-tightness between the cylinder and the load lid due to an impact of the outer circumferential edge of the lower face of the load lid and an outer circumferential edge of the upper face of the bottom plate of the cylinder can be prevented.

Effect of the Invention

According to a first aspect of the present invention, when wine is poured into a cylinder and a cock is opened, the wine is poured into a glass through a wine flow-out tube by static load of a load lid and weight of the wine. Here, since there is almost no possibility that the wine comes into contact with the atmosphere, wine is prevented from oxidizing. Additionally, the cylinder and the load lid are made of glass. Thus, liquid-tightness between each of the sliding faces is higher than that of a conventional cylinder and load lid made of stainless steel. Thus, there is almost no possibility that outer air enters a wine storing portion in the cylinder through a gap between each of the sliding faces and oxidizes the wine. Since the cylinder is made of glass, wine can be stored at the same conditions as those of storing wine in a bottle. Further, sanitation management is easy. Furthermore, the problem in which the cylinder and load lid are firmly fixed to each other from the rust of stainless steel is solved.

When wine is poured into the cylinder, sediment and tartar in the wine falls and they are collected in a foreign matter collecting recess portion. Thus, there is little possibility that, in dispensing the wine, the sediment and tartar flow into a glass through the wine flow-out tube. Additionally, wine with stable quality can be dispensed for a long time, and wine in the cylinder can be visually recognized.

According to a second aspect of the present invention, when the load lid reaches a lowest point of an inner space of the cylinder, only a central portion of a lower face of the load lid is supported by a central portion of an upper face of a bottom plate of the cylinder. That is, an outer circumferential edge (lower edge portion of a circumferential side wall), which is most easily damaged by contact between the load lid and the cylinder, of the lower face of the load lid does not come into contact with the cylinder. Accordingly, an impact of the outer circumferential edge of the lower face of the load lid and an outer circumferential edge of the upper face of the bottom plate of the cylinder can be prevented from lowering liquid-tightness between the cylinder and the load lid.

BEST MODE FOR CARRYING OUT THE INVENTION

Hereinafter, an embodiment of the present invention will be specifically described. Here, a wine dispenser for dispensing high-grade wine by the glass is cited, the wine containing sediment and tartar.

Embodiment 1

Figure 1:
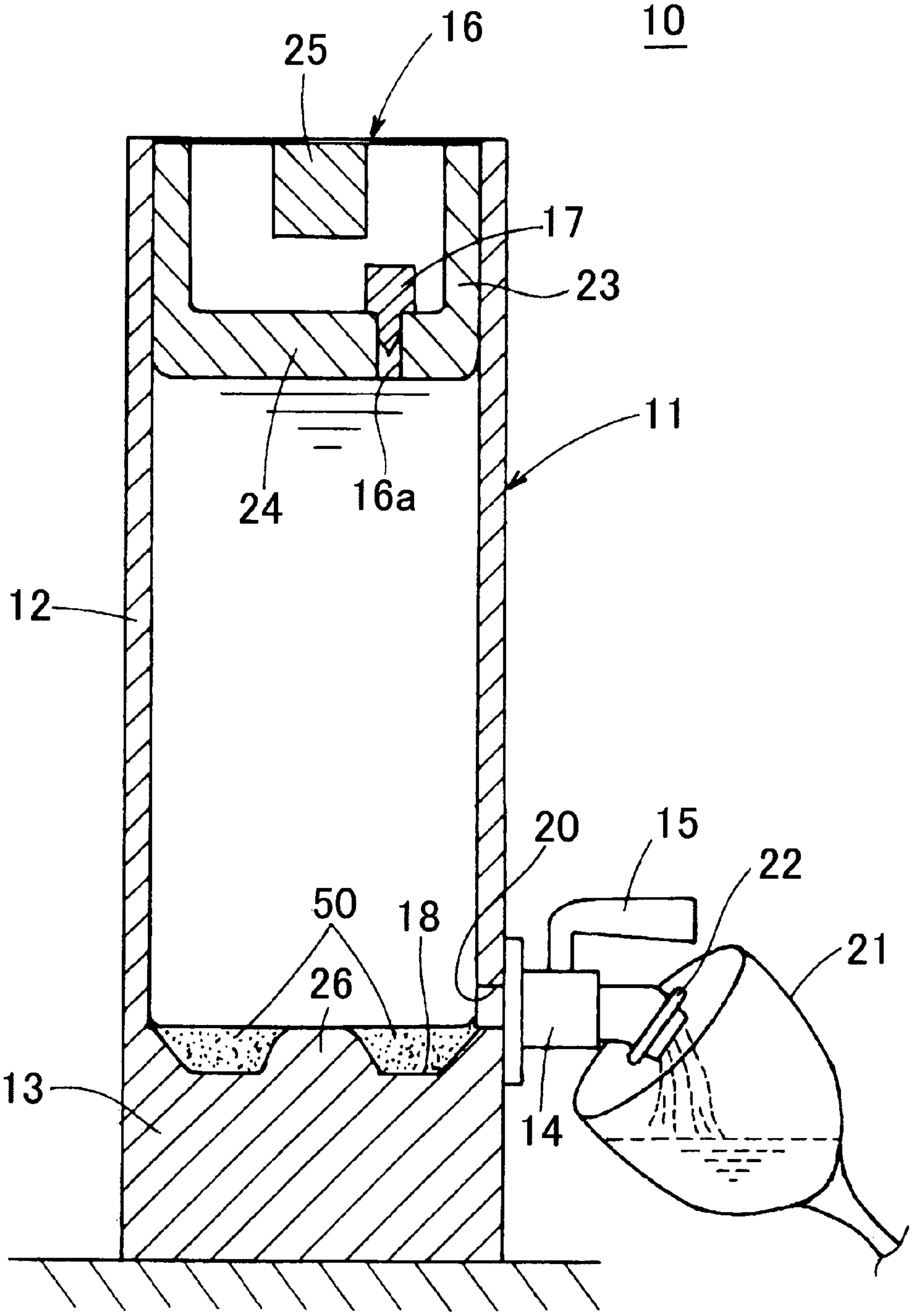
FIG. 1 is a vertical cross sectional view of a wine dispenser in use according to a first embodiment of the present invention.
Figure 2:
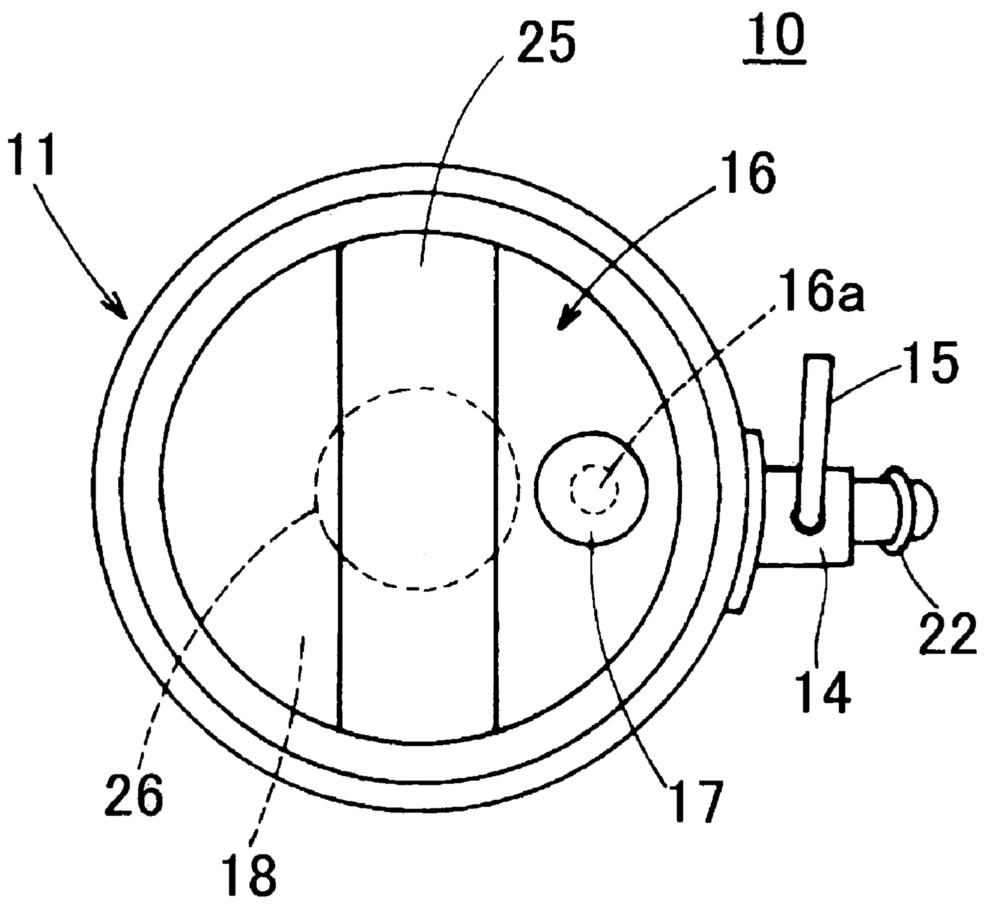
FIG. 2 is a plan view of the wine dispenser according to the first embodiment of the present invention.
Figure 3:
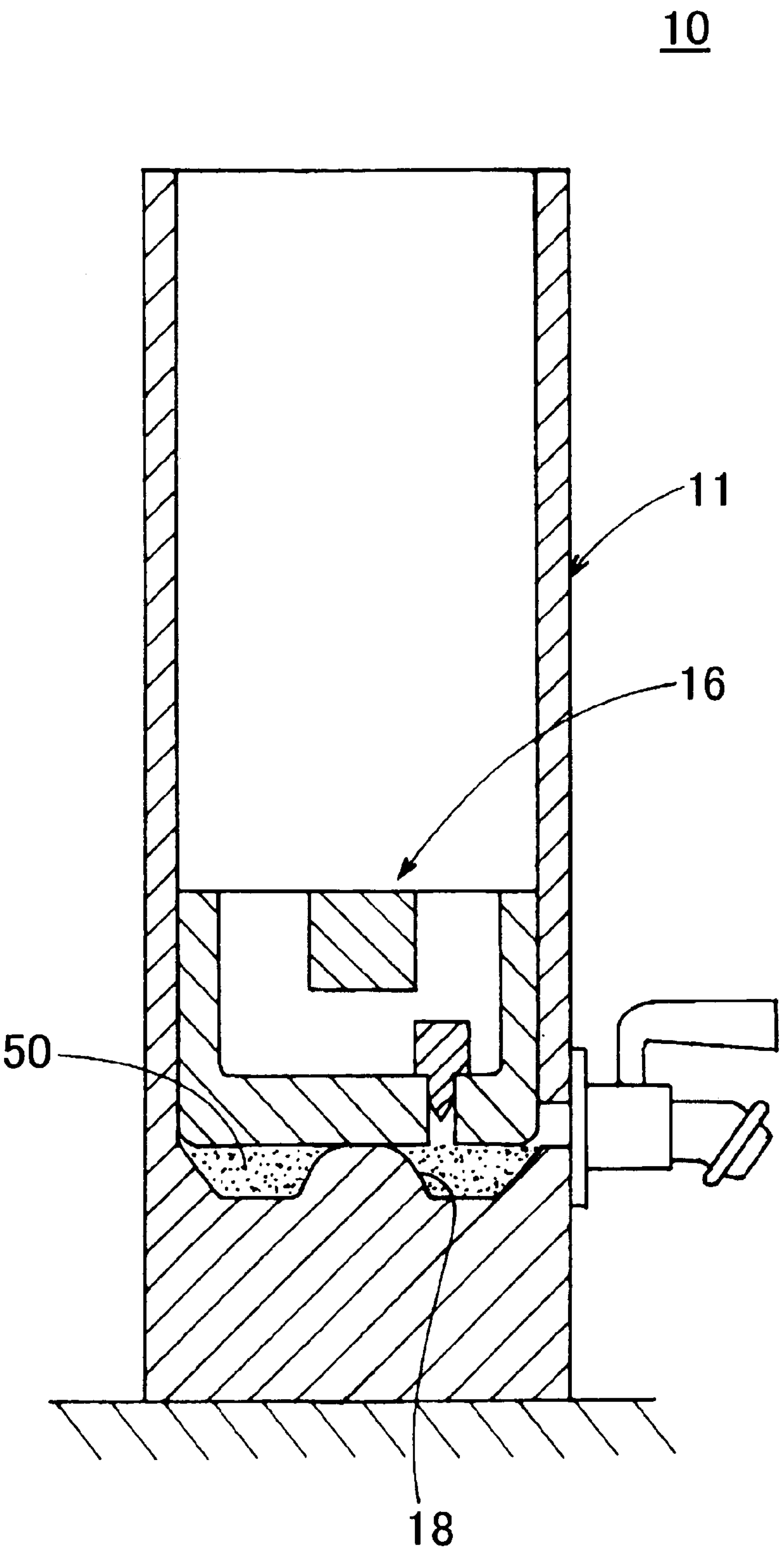
FIG. 3 is a vertical cross sectional view of the wine dispenser after wine is dispensed according to the first embodiment of the present invention.

In FIGS. 1 and 2, the reference numeral 10 denotes a wine dispenser according to a first embodiment of the present invention. The wine dispenser 10 includes: an upright cylinder 11 which has an opened upper end face and stores wine; a wine flow-out tube 14 which communicates with an inner space of the cylinder 11 and has a lower end of a butt side opening arranged on a circumferential side wall 12 of the cylinder 11 at the same height as that of a flat upper face of a bottom plate 13 of the cylinder 11; a cock 15 provided in the middle of the wine flow-out tube 14; a load lid 16 which rises/falls, in a state where an outer circumferential face of the load lid liquid-tightly comes into contact with an inner circumferential face of the cylinder 11, in the space of the cylinder 11 and has an air vent hole 16*a* penetrating from an upper face to lower face of the load lid; and a stopper 17 for stopping up the air vent hole 16*a*.

Hereinafter, these components will be specifically described.

The cylinder 11 is made of transparent hard glass, and the bottom plate 13 of the cylinder 11 is thickly formed. A foreign matter collecting recess portion 18 for collecting sediment and tartar 50 of wine is annularly formed on a region, except a central portion supporting the load lid 16 reaching a lowest point, of the upper face of the bottom plate 13.

A wine discharge port 20 communicating with the butt side opening of the wine flow-out tube 14 is formed in a portion, which comes into contact with the upper face of the bottom plate 13, of the circumferential side wall 12 of the cylinder 11.

Additionally, a rubber buffering ring 22 is formed at the periphery of a top end of the wine flow-out tube 14 so that an impact when the top end comes into contact with a glass 21 does not crack the glass 21.

The load lid 16 is made of hard glass having the same hardness as that of the cylinder 11 and is a container-shaped lid having a cylindrical circumferential side wall 23, a bottom plate 24 for sealing an opened lower face of the circumferential side wall 23 and a square-bar-shaped knob 25 laid on an upper end of the circumferential side wall 23. One air vent hole 16*a* is formed in part of an outer circumferential portion of the bottom plate 24 of the load lid 16. The stopper 17 is a plastic slender top member. The lower face of the load lid 16 is parallel with the upper face of the bottom plate 13 of the cylinder 11.

Next, a method for using the wine dispenser 10 according to the first embodiment of the present invention will be described.

First, the load lid 16 is taken out from the cylinder 11, and wine in a bottle is poured into the inner space of the cylinder 11. Immediately after that, the load lid 16 is inserted into the cylinder 11 with the lower face of the load lid 16 coming into contact with a surface of the wine. Here, the stopper 17 is pulled out and the air vent hole 16*a* is opened. Thus, air collecting between the surface and the load lid 16 is released into the atmosphere through the air vent hole 16*a*. Then, the air vent hole 16*a* is stopped up with the stopper 17, the wine is left for a predetermined time, and sediment and tartar 50 in the wine fall and they are collected in the foreign matter collecting recess portion 18. During this time, a label of the bottle is peeled off and stuck to an outer face of the circumferential side wall of the cylinder 11.

The cock 15 is opened in this state. Thus, wine in the cylinder 11 is poured into the glass 21 from the wine flow-out tube 14 by static load of the load lid 16 and weight of the wine. Accordingly, the load lid 16 gradually falls in accordance with the dispensing amount of wine with the outer circumferential face of the load lid coming into contact with the inner circumferential face of the cylinder 11. Thus, during use of the wine dispenser 10, wine hardly comes into contact with the atmosphere and is prevented from oxidizing.

The lower end of the butt side opening of the wine flow-out tube 14 is arranged on the circumferential side wall of the cylinder 11 at the same height as that of the flat upper face of the bottom plate 13 of the cylinder 11. Thus, even if the cylinder 11 is not inclined, wine, except sediment and tartar 50 in the foreign matter collecting recess portion 18, in the cylinder 11 can be entirely discharged from the wine flow-out tube 14.

When the load lid 16 reaches the lowest point of the inner space of the cylinder 11, only a central portion of the lower face of the load lid 16 is supported by a central portion 26 of the upper face of the bottom plate 13 of the cylinder 11. That is, an outer circumferential edge (lower edge portion of the circumferential side wall), which is most easily damaged by contact between the load lid and the cylinder 11, of the lower face of the load lid 16 does not come into contact with the bottom plate 13 of the cylinder 11. Accordingly, lowering of the liquid-tightness between the cylinder 11 and the load lid 16 due to an impact of the outer circumferential edge of the lower face of the load lid 16 and an outer circumferential edge of the upper face of the bottom plate of the cylinder 11 can be prevented.

The cylinder 11 and the load lid 16 are made of glass. Thus, liquid-tightness between each of the sliding faces is higher than that of conventional cylinder 11 and load lid 16 made of stainless steel. Thus, there is almost no possibility that outer air enters a wine storing portion in the cylinder 11 through a gap between each of the sliding faces and oxidizes wine. Since the cylinder 11 is made of glass, wine can be stored at the same conditions as those of storing wine in a bottle and sanitation management is easy. Further, the problem in which the cylinder 11 and load lid 16 are firmly fixed to each other from the rust of stainless steel is solved. Further, since the cylinder 11 is made of transparent glass, wine can be visually recognized through the cylinder 11. Specifically, the color and residual amount of the wine can be seen. Furthermore, wine with stable quality can be dispensed for a long time.

After wine is poured into the cylinder and left for a predetermined time, sediment and tartar 50 in the wine fall and they are collected in the foreign matter collecting recess portion 18. Thus, when the cock 15 is opened and the wine is dispensed, there is little possibility that the sediment and tartar 50 flow into the glass 21 through the wine flow-out tube 14.

Figure 4:
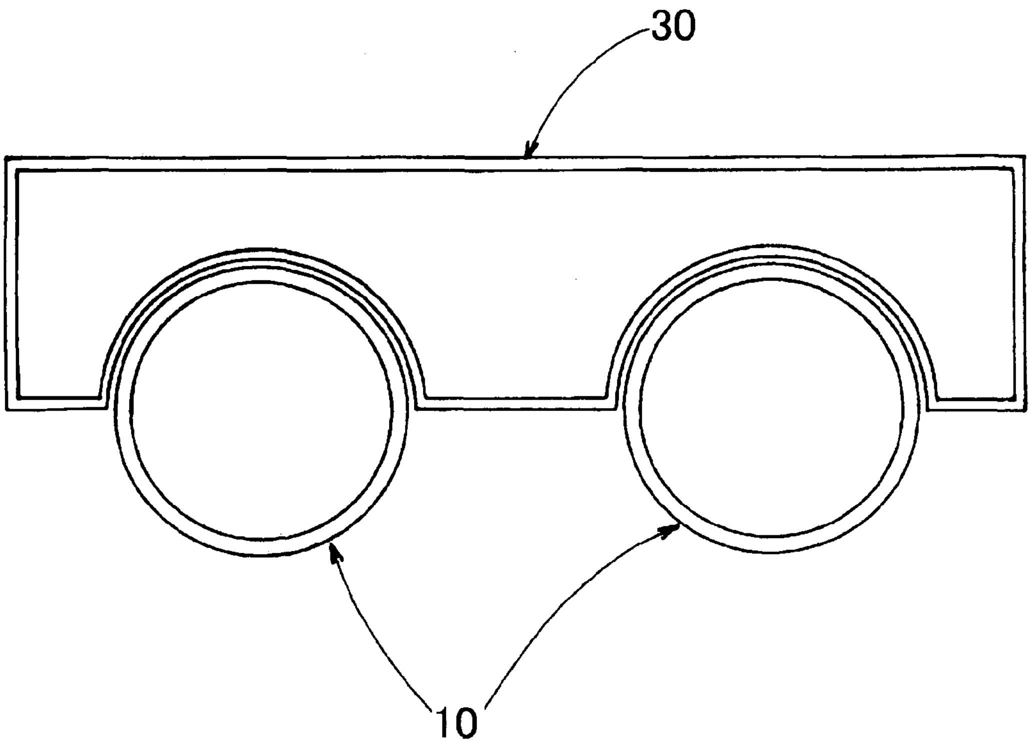
FIG. 4 is a plan view showing a state where the two wine dispensers according to the first embodiment of the present invention are set on a refrigerator.

Moreover, as shown in FIG. 4, two wine dispensers filled with different kinds of wine may be set in a refrigerator 30 so as to be used at a wine tasting party. The refrigerator 30 may be a container housing ice or refrigerating agent therein, an electric cooler for circulating refrigerant in a tube. The wine dispenser 10 can be used not only for business purposes but also in a home.

INDUSTRIAL APPLICABILITY

The present invention is effective for selling matured high-grade wine, which contains sediment and tartar, by the glass.

DESCRIPTION OF THE SYMBOLS

10 . . . Wine dispenser
11 . . . Cylinder
12 . . . Circumferential side wall
13 . . . Bottom plate
14 . . . Wine flow-out tube
15 . . . Cock
16*a* . . . Air vent hole
16 . . . Load lid
17 . . . Stopper
18 . . . Foreign matter collecting recess portion
26 . . . Central portion
50 . . . Sediment and tartar

The invention claimed is:

1. A wine dispenser comprising:

an upright cylinder which has an opened upper end face and stores wine;

a wine flow-out tube communicating with an inner space of the cylinder;

a cock provided in the middle of the wine flow-out tube;

a load lid which rises/falls, in a state where an outer circumferential face of the load lid liquid-tightly comes into contact with an inner circumferential face of the cylinder, in an inner space of the cylinder and has an air vent hole penetrating from an upper face to a lower face of the load lid;

a stopper for stopping up the air vent hole, wherein the cylinder and the load lid are made of glass, a central portion of an upper face of a bottom plate of the cylinder is flatly formed and a foreign matter collecting recess portion for collecting sediment and tartar of the wine is annularly formed on the whole of a region surrounding the central portion, a lower face of the bottom plate of the cylinder is flatly formed, and the wine flow-out tube has a lower end of a butt side opening arranged at the same height as that of the flat central portion of the upper face of the bottom plate of the cylinder.

* * * * *